United States Patent [19]
Fan

[11] Patent Number: 5,590,860
[45] Date of Patent: Jan. 7, 1997

[54] CLIP STAND FOR MOBILE TELECOMMUNICATION DEVICES

[76] Inventor: Eagle Fan, No. 30, Luchang, Luchang Li, Chuhpei City, Hsin Chuh, Taiwan

[21] Appl. No.: 426,842

[22] Filed: Apr. 24, 1995

[51] Int. Cl.$^6$ ............................................. A47G 29/00
[52] U.S. Cl. ........................ 248/126; 24/3.12; 24/67.11; 248/229.13
[58] Field of Search ........................... 248/126, 205.1, 248/229.13, 229.23, 228.4, 231.51, 316.5, 456, 455; 24/67.11, 67.7, 3.11, 3.12, 531

[56] References Cited

U.S. PATENT DOCUMENTS

| | | | |
|---|---|---|---|
| 392,466 | 11/1888 | Shurtleff | 248/126 X |
| 1,499,102 | 6/1924 | Farber | 248/126 |
| 3,100,326 | 8/1963 | Buck | 24/67.7 X |
| 4,467,727 | 8/1984 | Strommer | 248/456 X |
| 4,883,290 | 11/1989 | Landa | 24/3.11 X |
| 5,385,282 | 1/1995 | Chen | 24/3.11 X |

Primary Examiner—Ramon O. Ramirez
Attorney, Agent, or Firm—Beveridge, DeGrandi, Weilacher & Youn, L.L.P.

[57] ABSTRACT

A clip stand for mobile telecommunication devices such as mobile phones and beepers includes a bottom cover, a connected board, an inlaid bar and an upper cover. The bottom cover is attached to the connected board. A twisted spring is installed between the bottom cover and the connected board. On the bottom side of the connected board is a segment trough which has several protuberant strips on its surface. An inlaid bar is held in place by an upper cover affixed to the top of the connected board. The horizontal hook on one end of the inlaid bar is placed inside the segment trough of the connected board. When the inlaid bar is pivoting, the horizontal hook will move through the protuberant strips of the segment trough.

9 Claims, 5 Drawing Sheets

CLIP STAND FOR MOBILE TELECOMMUNICATION DEVICES

This invention relates to a clip stand for mobile telecommunication devices such as mobile phones and beepers and which has the functions of clipping to the mobile phones and beepers and providing multisectional angle-adjustments while supporting such devices.

THE BACKGROUND OF THE INVENTION

With the rapid progress of economy and industry, the life pace of human beings is faster. The contact among human beings will not just depend on letters or telephones. To the business men, time is the most important issue. Thus, the letters and phone calls will not be sufficient any more. The beepers and mobile phones are on the market instead.

For the common beepers or mobiles phones, the users need to bring them and put them in a place where it is obvious to see and easy to get them. However, putting one into one's pocket is a hassle, since they are too large and heavy, and it is not convenient to carry them in one's hands. As to the beepers we see on the market, there is a clip board on the back. The beeper could be clipped to other accessories. However, there are still a lot of inconveniences in its use.

THE SUMMARY OF THE INVENTION

The main purpose of this invention is to provide a clip stand. The twisted spring installed between the connected board and bottom cover provides them with a clipping force. The connected board and bottom cover can achieve the clipping force with the twisted spring installed between them. The twisted spring is held in place by the segment trough on the connected board. When pivoting, the inlaid bar's horizontal hook is held in place by two protuberant strips in the segment trough. Thus, the clip stand has multiple positions depending on where the inlaid bar is pivoted. Thus, in order to understand more about the structures, purposes, characteristics and effectiveness of this invention, we provide the detailed and clear explanation accompanied with the following figures.

THE DESCRIPTION OF THE NUMBERS IN THE FIGURES

Figure 1:
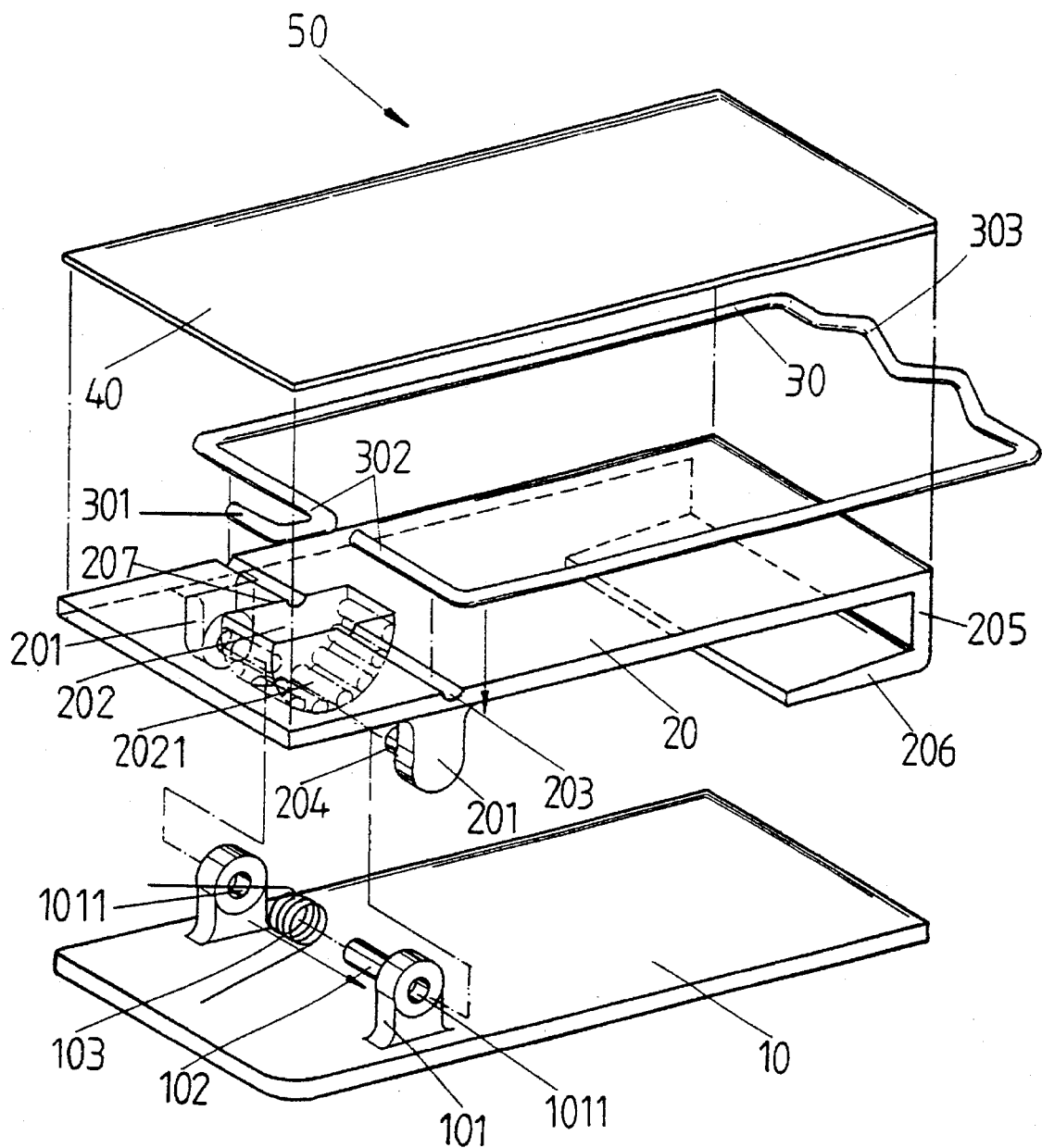
FIG. 1 an exploded view of this invention.

10 Bottom cover
101 Shield
1011 Opening
102 Horizontal pole
103 Twisted spring
20 Connected board
201 Shield
202 Segment trough
2021 Protuberant strips
203 Trough
204 Hook
205 Panel
206 Member
207 Opening
30 Inlaid bar
301 Horizontal hook
302 Ends
303 Triangular waveform portion
40 Upper cover
50 Clip stand
60 Mobile phone

DETAILED DESCRIPTION OF THIS INVENTION

Please refer to the fragmentary view of this invention (FIG. 1). The bottom cover (10) of the clip stand (50) has two shields (101). One shield (101) has a horizontal pole (102) which holds a twisted spring (103). A connected board (20) attaches to the openings (1011) of the shields (101) of the bottom cover by the hooks (202) attached to the shields (201) depending from the bottom of the connected board (20). Therefore, it can cover the bottom cover (10) and twisted spring (103) and connect them. Between the shields on the connected board (20) there is an opening (207) that connects to the segment trough (202) which has many protuberant strips (2021) on its surface. An inlaid bar (30) is laid in the troughs (203) on the connected board (20). The ends (302) of the inlaid bar are installed in the trough (203) of the connected board (20) horizontally. One end has a horizontal hook (301) that pivots inside the segment trough (202). The inlaid bar extends beyond the other rim of the connected board (20). The inlaid bar (30) is held in place by the upper cover (40). Therefore, the ends (302) of the inlaid bar (30) rest inside the trough (203) of the connected board (20) and will not be shown outside. The connected board has a panel (205) depending from a lateral edge to provide spacing with the bottom cover. The panel (205) has a member (206) horizontally extending from its bottom edge.

Figure 2:
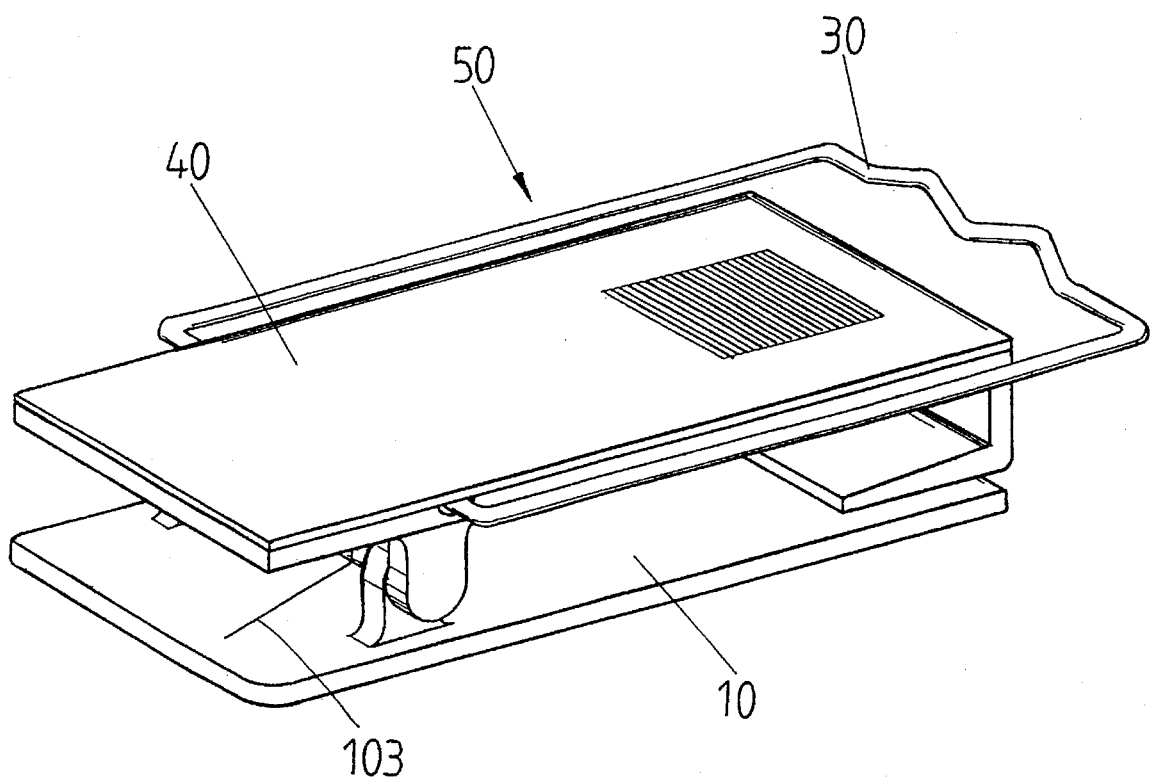
FIG. 2 is a perspective view of this invention after being assembled.
Figure 3:
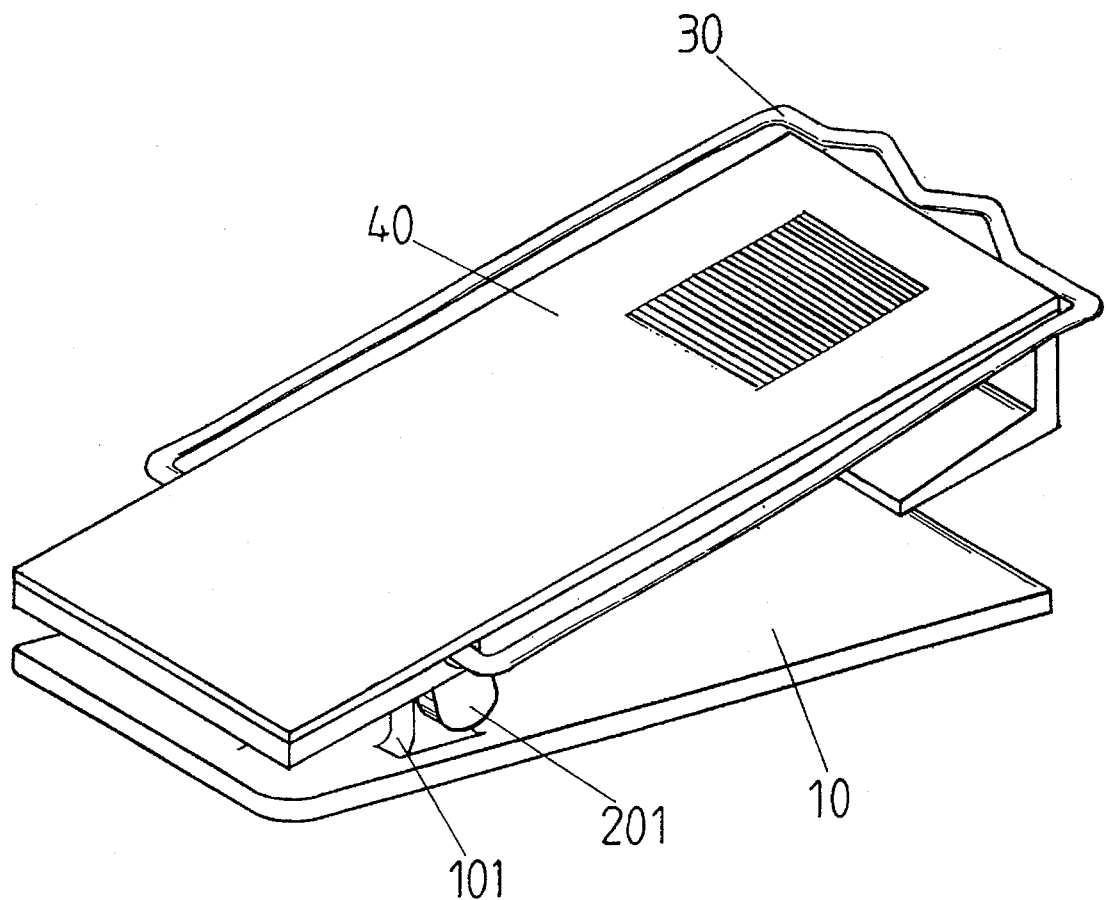
FIG. 3 a perspective view of this invention with the operation of clipping.
Figure 4:
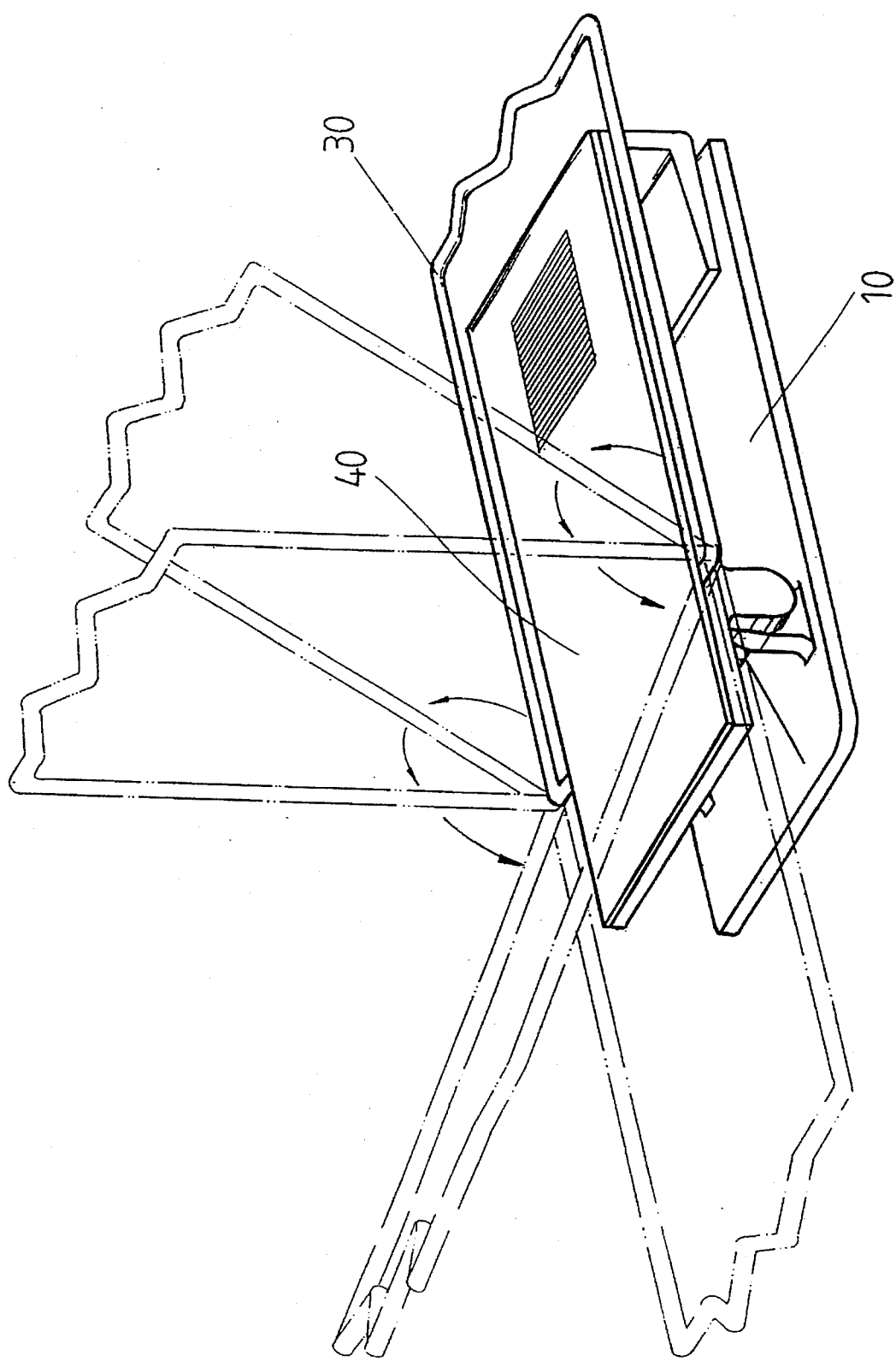
FIG. 4 is a perspective view of this invention showing the pivoting positions of the inlaid bar.

FIGS. 2 and 3 are the views of this invention after being built and clipped. The twisted spring (103) is between the upper cover (40) and the bottom cover (10). When pressing the front tip of the clip stand (50), the rear will be open and clipped to other things. FIG. 4 is the view of this invention with the inlaid bar shown in various pivoting positions. Please refer to the fragmentary view of FIG. 1, where the ends of the inlaid bar (30) are shown folded inwardly in the troughs between the connected board (20) and upper cover (40). The horizontal hook (301) pivots inside the segment trough (202) of the connected board(20). Therefor when pivoting the inlaid bar (30), the horizontal hook rests between two protuberant strips (2021) after being pivoted and when the inlaid bar is at its initial position or 180 degrees, the horizontal hook rest against one protuberant strip. As the inlaid bar (30) is being pivoted, the horizontal hook (301) moves along the segment trough (202) and horizontal hook (301) of the inlaid bar (30) is strained by the protuberant strips (2021) in the segment rough (202). This provides the inlaid bar with multiple angled locations.

Figure 5:
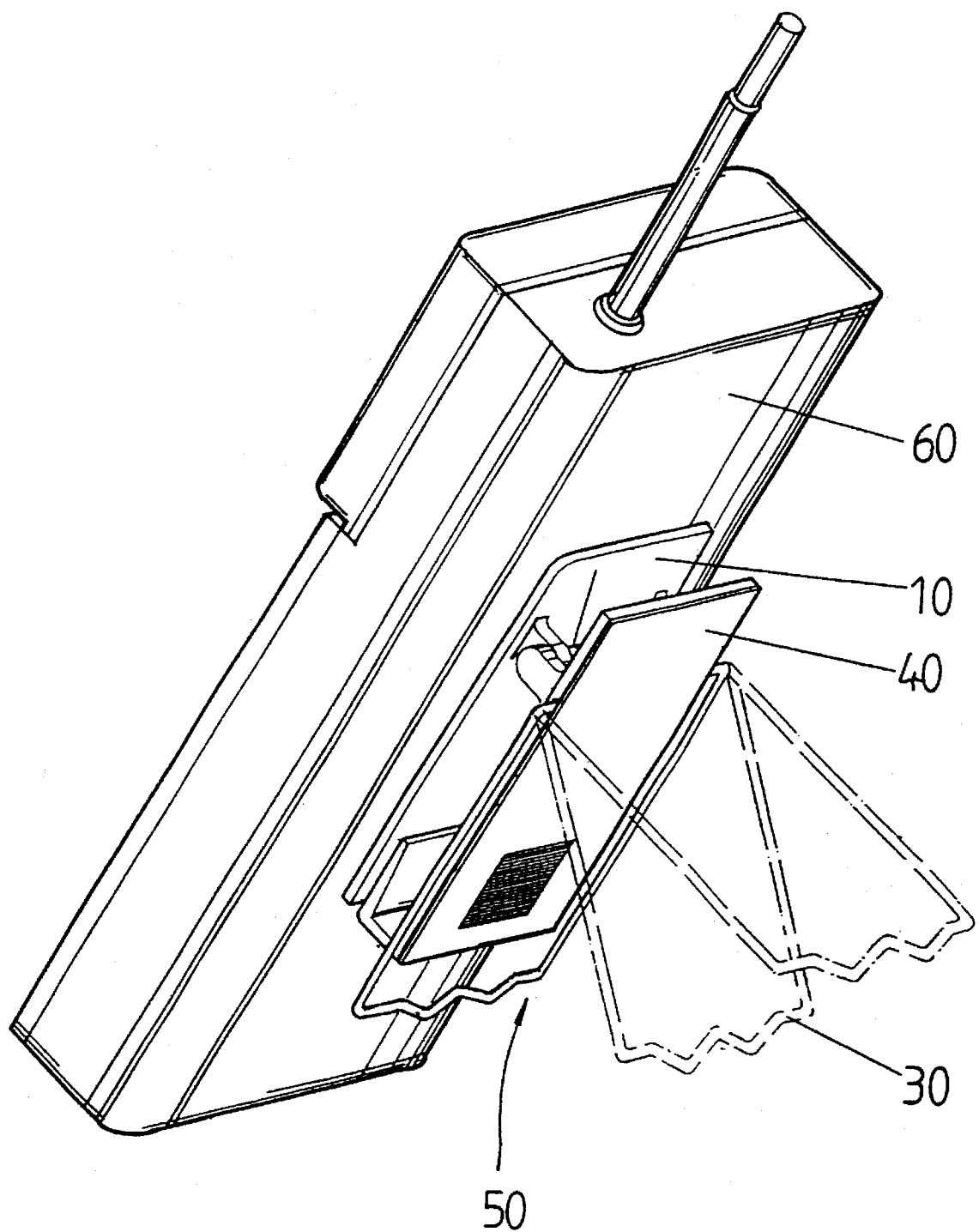
FIG. 5 is the operation of the clip stand of this invention with a mobile phone.

FIG. 5 is a view of this invention being operated. The clip stand (50) may be fixed to a mobile phone or beeper. This example is where it is attached to a mobile phone (60). The clip stand (50) is fixed to the back side of the mobile phone (60). When the mobile phone is not in use, the inlaid bar could be turned to a slanted angle. This enables the mobile phone (60) to sit on a table. Simultaneously, the inlaid bar (30) could be revolved to the degree of 180 and parallel to the mobile phone (60). The triangular form portion (303) enables the phone to hang in a car or on the wall, and save room. Also, the clipping design helps the mobile phone (60) clip to the body. It is very practical and convenient.

To sum up, this invention achieves the above functions. Besides, this invention has not been released to any medias. It is qualified to be patented.

However, the above mentioned example is the best example of the invention. The operation of this invention should not limited by this example. The change and the upgrading based on the patent right of this invention should be included in the scope of this patent of this invention.

I claim:

1. A clip stand adapted to be affixed to a mobile telephone or beeper comprising
   a bottom cover,
   a pair of shields attached to a surface of said bottom cover and spaced from each other, each of said shields having an opening on its outer surface, one of said shields having a pole affixed to and extending from the inner surface of said shield toward said other shield;
   a coiled spring mounted on said pole,
   a connected board having a pair of hooks depending from the bottom surface of said board, each of said hooks engaging the openings in the outer surfaces of said shields whereby said connected board is pivotally mounted on said bottom cover,
   said connected board having an opening therethrough,
   a segment trough in communication with said opening and extending below said opening, said segment trough provided with a plurality of horizontally disposed protuberant strips,
   said connected board having a pair of troughs extending laterally across said surface, each trough extending from a longitudinal edge of said connected board to said opening in said board;
   an inlaid bar having a pair of end portions disposed within the respective troughs on said connected board, one of said end portions having a hook extending therefrom and engaging at least one of said protuberant strips of said segment trough,
   said coiled spring having an end in contact with the upper surface of said bottom cover and its other end in contact with the bottom surface of said connected board,
   and an upper cover affixed to said upper surface of said connected board to retain the end portions of said inlaid bar within said troughs and to retain said hook portion of said inlaid bar within the segment trough.

2. The clip stand as defined in claim 1, wherein said troughs in said connected board are in axial alignment.

3. The clip stand as defined in claim 2, wherein said opening in said connected board has a rectangular shape.

4. The clip stand as defined in claim 3, wherein said connected board has a panel depending from a lateral edge to provide spacing between said connected board and said bottom cover.

5. The clip stand as defined in claim 4, wherein said panel depending from said connected board has a member horizontally extending from the bottom edge of said panel.

6. The clip stand as defined in claim 1, wherein a portion of said inlaid bar adjacent each of said end portions extends along the longitudinal edges of said connected board.

7. The clip stand as defined claim 6, wherein said longitudinally extending portions of said inlaid bar are of a length sufficient to extend beyond a lateral edge of said connected board.

8. The clip stand as defined in claim 7, wherein the ends of each of said longitudinally extending portions of said inlaid bar extending beyond the lateral edge of said connected board are connected by a portion of said inlaid bar having a triangular waveform.

9. A clip stand adapted to be affixed to a mobile telephone or beeper comprising
   a rectangular bottom cover,
   a pair of shields attached to a surface of said bottom cover and spaced from each other along opposite longitudinal edges of said bottom cover, each of said shields having a circular opening on its outer surface, one of said shields having a pole affixed to and extending horizontally from the inner surface of said shield toward said other shield;
   a coiled spring mounted on said pole,
   a connected board having a pair of shields spaced opposite from each other and depending from the bottom surface of said board adjacent the longitudinal edges of said board, each of said shields having a hook extending horizontally from the inner surface of said shield, each of said hooks engaging the opening in the outer surface of a shield attached to said bottom cover, whereby said connected board is pivotally mounted on said bottom cover,
   said connected board having a rectangular opening therethrough,
   a segment trough in communication with said opening and extending below said opening, said segment trough provided with a plurality of horizontally disposed protuberant strips, each of said strips having a rounded cross-section in the longitudinal direction,
   said connected board having a pair of troughs extending laterally across said upper surface, each trough extending from a longitudinal edge of said connected board to said opening in said board;
   an inlaid bar having a pair of end portions disposed within the respective troughs on said connected board, one of said end portions having a horizontal hook extending therefrom and engaging at least one of said protuberant strips of said segment trough, said inlaid bar being pivotable about the axis of said troughs, a portion of said inlaid bar adjacent each of said end portions extending along the longitudinal edges of said connected board, said portions being of a length sufficient to extend beyond a lateral edge of said connected board, said ends of said inlaid bar extending beyond said lateral edge of said connected board joined together by a portion of said inlaid bar having a triangular wave configuration,
   said coiled spring having one end in contact with the upper surface of said bottom cover and its other end in contact with the bottom surface of said connected board,
   and an upper cover affixed to said upper surface of said connected board to retain the end portions of said inlaid bar within said troughs and to retain said horizontal hook portion of said inlaid bar within the segment trough.

* * * * *